(12) United States Patent
Colwell et al.

(10) Patent No.: US 9,676,431 B2
(45) Date of Patent: Jun. 13, 2017

(54) CRAWLER TRACK

(71) Applicant: Harnischfeger Technologies, Inc., Wilmington, DE (US)

(72) Inventors: Joseph J. Colwell, Hubertus, WI (US); Ken Wheeler, West Bend, WI (US)

(73) Assignee: Harnischfeger Technologies, Inc., Wilmington, DE (US)

(*) Notice: Subject to any disclaimer, the term of this patent is extended or adjusted under 35 U.S.C. 154(b) by 247 days.

(21) Appl. No.: 14/285,255

(22) Filed: May 22, 2014

(65) Prior Publication Data

US 2014/0346856 A1 Nov. 27, 2014

Related U.S. Application Data

(60) Provisional application No. 61/827,259, filed on May 24, 2013.

(51) Int. Cl.
| B62D 55/26 | (2006.01) |
| B62D 55/12 | (2006.01) |
| B62D 55/14 | (2006.01) |
| B62D 55/20 | (2006.01) |

(52) U.S. Cl.
CPC ............. *B62D 55/26* (2013.01); *B62D 55/12* (2013.01); *B62D 55/14* (2013.01); *B62D 55/202* (2013.01)

(58) Field of Classification Search
CPC ...... B62D 55/26; B62D 55/12; B62D 55/202; B62D 55/14; B62D 55/20; B65G 23/06; B65G 23/04; B65G 17/08; B65G 17/40
USPC ....... 305/185, 186, 187, 190, 195, 198, 200, 305/201; 198/835, 838, 850–853
See application file for complete search history.

(56) References Cited

U.S. PATENT DOCUMENTS

| 2,452,921 | A | 11/1948 | Gillespie |
| 3,053,579 | A | 9/1962 | Trudeau |
| 3,128,130 | A | 4/1964 | Harris |
| 3,165,364 | A | 1/1965 | Hardman et al. |
| 3,307,882 | A | 3/1967 | McFayden |
| 3,601,212 | A | 8/1971 | Peterson et al. |
| 3,680,928 | A | 8/1972 | Kraschnewski et al. |
| 3,721,476 | A | 3/1973 | Andersson |
| 3,913,986 | A * | 10/1975 | Schaffner ............... B62D 55/20 305/187 |

(Continued)

FOREIGN PATENT DOCUMENTS

| AU | 2003100265 A4 | 8/2003 |
| JP | 3106814 | 11/2000 |

(Continued)

*Primary Examiner* — S. Joseph Morano
*Assistant Examiner* — Jean Charleston
(74) *Attorney, Agent, or Firm* — Michael Best & Friedrich LLP

(57) ABSTRACT

A shoe for a crawler track includes a first end, a second end, a longitudinal axis extending between the first and second ends, a roller path axis extending perpendicular to the longitudinal axis, and an intermediate portion disposed between the first and second ends. The intermediate portion includes a roller-engaging portion disposed along the roller path axis, the intermediate portion including four successive faces that form a parallelogram when viewed from a direction substantially perpendicular to the longitudinal axis, two of the four faces being disposed at an acute angle relative to the longitudinal axis.

15 Claims, 11 Drawing Sheets

(56) References Cited

U.S. PATENT DOCUMENTS

| | | | |
|---|---|---|---|
| 4,097,093 | A | 6/1978 | Shelby et al. |
| 4,139,240 | A * | 2/1979 | Profio .................. B62D 55/062 29/891.1 |
| 4,175,797 | A | 11/1979 | Krekeler |
| 4,176,887 | A | 12/1979 | Alpers et al. |
| 4,278,301 | A | 7/1981 | Gregor et al. |
| 4,391,341 | A | 7/1983 | Taghon |
| 4,425,007 | A | 1/1984 | Soeteber |
| 4,583,791 | A | 4/1986 | Nagata et al. |
| 4,673,050 | A | 6/1987 | Zschocke |
| 4,805,968 | A | 2/1989 | Connerley |
| 5,072,800 | A * | 12/1991 | Price ....................... B62D 55/08 180/9.48 |
| 5,941,326 | A | 8/1999 | Fleuchaus |
| 6,012,848 | A | 1/2000 | Michioka et al. |
| 6,017,103 | A | 1/2000 | Villard |
| 6,543,863 | B1 | 4/2003 | Hannan et al. |
| D484,149 | S | 12/2003 | Hannan et al. |
| 6,659,573 | B1 | 12/2003 | Knecht et al. |
| 6,702,406 | B2 | 3/2004 | Yoshida et al. |
| D496,051 | S | 9/2004 | Yoshida |
| 6,820,948 | B2 | 11/2004 | Katoh |
| 6,929,335 | B2 * | 8/2005 | Colwell .................. B62D 55/14 305/194 |
| 7,410,225 | B1 | 8/2008 | Marzetta et al. |
| D588,167 | S | 3/2009 | Shimozono |
| D588,168 | S | 3/2009 | Shimozono |
| 7,530,650 | B2 | 5/2009 | Hannan et al. |
| 7,703,863 | B2 | 4/2010 | Koolhiran |
| D618,255 | S | 6/2010 | Abiko |
| 7,854,483 | B2 | 12/2010 | Bordini |
| 7,866,767 | B2 | 1/2011 | Lemaire et al. |
| D655,724 | S | 3/2012 | Shimozono |
| 8,272,701 | B2 | 9/2012 | Mulligan |
| D748,153 | S | 1/2016 | Colwell et al. |
| 2001/0054844 | A1 | 12/2001 | Rutz et al. |
| 2006/0181151 | A1 | 8/2006 | Wodrich et al. |
| 2010/0051358 | A1 | 3/2010 | Inaoka |
| 2011/0048817 | A1 | 3/2011 | Bessette et al. |
| 2011/0221266 | A1 | 9/2011 | Bonnetain et al. |
| 2013/0313891 | A1 | 11/2013 | O'Neill |
| 2014/0346856 | A1 | 11/2014 | Colwell et al. |
| 2015/0130268 | A1 | 5/2015 | Scheuerman et al. |
| 2015/0158536 | A1 | 6/2015 | Takagi et al. |
| 2015/0197294 | A1 | 7/2015 | Hakes |

FOREIGN PATENT DOCUMENTS

| | | |
|---|---|---|
| JP | 2014028556 | 2/2014 |
| WO | 2014027530 | 2/2014 |

* cited by examiner

CRAWLER TRACK

CROSS-REFERENCE TO RELATED APPLICATIONS

This application claims priority to U.S. Provisional Application No. 61/827,259, filed May 24, 2013, the entire contents of which are incorporated herein by reference.

FIELD OF THE INVENTION

The present invention relates to the field of mining shovels and excavators. Specifically, the present invention relates to a crawler track for a mining shovel and excavator.

BACKGROUND OF THE INVENTION

In mining equipment, such as mining shovels and excavators, crawler tracks are used for movement of the mining equipment. The crawler track includes individual links, also known as "shoes," that are coupled together to form an endless articulated track. The track shoes engage the ground and support a row of rollers, which engage the track shoes along a roller path axis as the track is driven. The weight of the mining equipment is borne by the particular track shoes engaged by the rollers. For movement of the mining equipment, heavy loads are transmitted through the rollers to the track shoes, and such loads may wear, deform, or distort the track shoes, particularly around the roller path axis.

SUMMARY

In accordance with one construction, a shoe for a crawler track includes a first end, a second end, a longitudinal axis extending between the first and second ends, a roller path axis extending perpendicular to the longitudinal axis, and an intermediate portion disposed between the first and second ends. The intermediate portion includes a roller-engaging portion disposed along the roller path axis, the intermediate portion including four successive faces that form a parallelogram when viewed from a direction substantially perpendicular to the longitudinal axis, two of the four faces being disposed at an acute angle relative to the longitudinal axis.

In accordance with another construction, a shoe for a crawler track includes a first end, a second end, a longitudinal axis extending between the first and second ends, a roller path axis extending perpendicular to the longitudinal axis, and an intermediate portion integrally formed with the first and second ends and disposed between the first and second ends. The intermediate portion includes a roller-engaging portion disposed along the roller path axis, the intermediate portion including at least one face disposed at an acute angle relative to the longitudinal axis.

In accordance with another construction, a crawler track includes a first and second shoe coupled together, each of the first and second shoes including a first end, a second end, a longitudinal axis extending between the first and second ends, a roller path axis extending perpendicular to the longitudinal axis, and an intermediate portion disposed between the first and second ends. Each intermediate portion includes a roller-engaging portion disposed along the roller path axis. Each intermediate portion also includes an angled face disposed at an acute angle relative to the longitudinal axis. The angled face of the first shoe at least partially overlaps the angled face of the second shoe along an axis extending parallel to the longitudinal axes of the first and second shoes.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
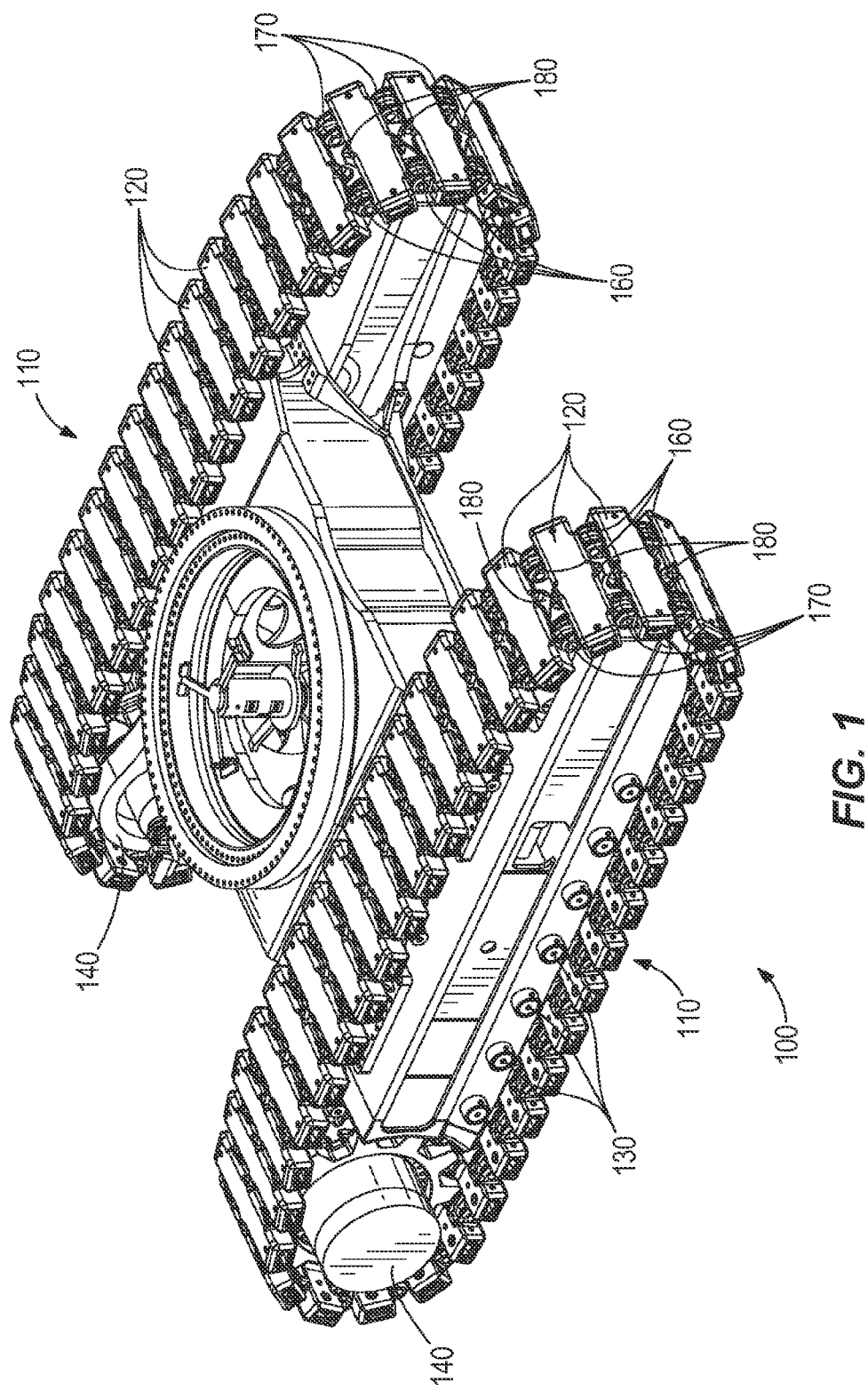
FIG. 1 is a partial perspective view of a mining equipment including crawler tracks according to one embodiment of the invention.

FIG. 1 is a partial perspective view of a mining equipment 100, such as a mining shovel or an excavator, including a pair of crawler tracks 110 for movement. Each crawler track 110 includes individual links or "shoes" 120 that are coupled or linked together, e.g., via a pivoting pin (not shown), to form an endless articulated track.

With reference to FIGS. 2-5 and 8-12, the links 120 are coupled together via female and male members 122, 124, respectively. Each of the female and male members 122, 124 includes a respective hole 126, 128 that extends through the member 122, 124. When a hole 126 of one of the female members 122 is aligned with a hole 128 of one of the male members 124 of an adjacent shoe 120, a pin (not shown) is inserted through the holes 126, 128 to pivotally link the shoes 120 and thereby form an endless articulated track. The shoes 120 engage the ground (not shown) and support a row of rollers 130 (FIGS. 1, 3, 4) from underneath.

With reference to FIG. 1, at an end of the row of rollers 130, the shoes 120 are angulated around a drive sprocket, idler, or tumbler 140. The drive sprocket 140 drives the track 110 for movement of the mining equipment 100. The rollers 130 roll upon the ground-engaging shoes 120 of the track 110 as the track 110 is driven by the sprocket 140.

Figure 3:
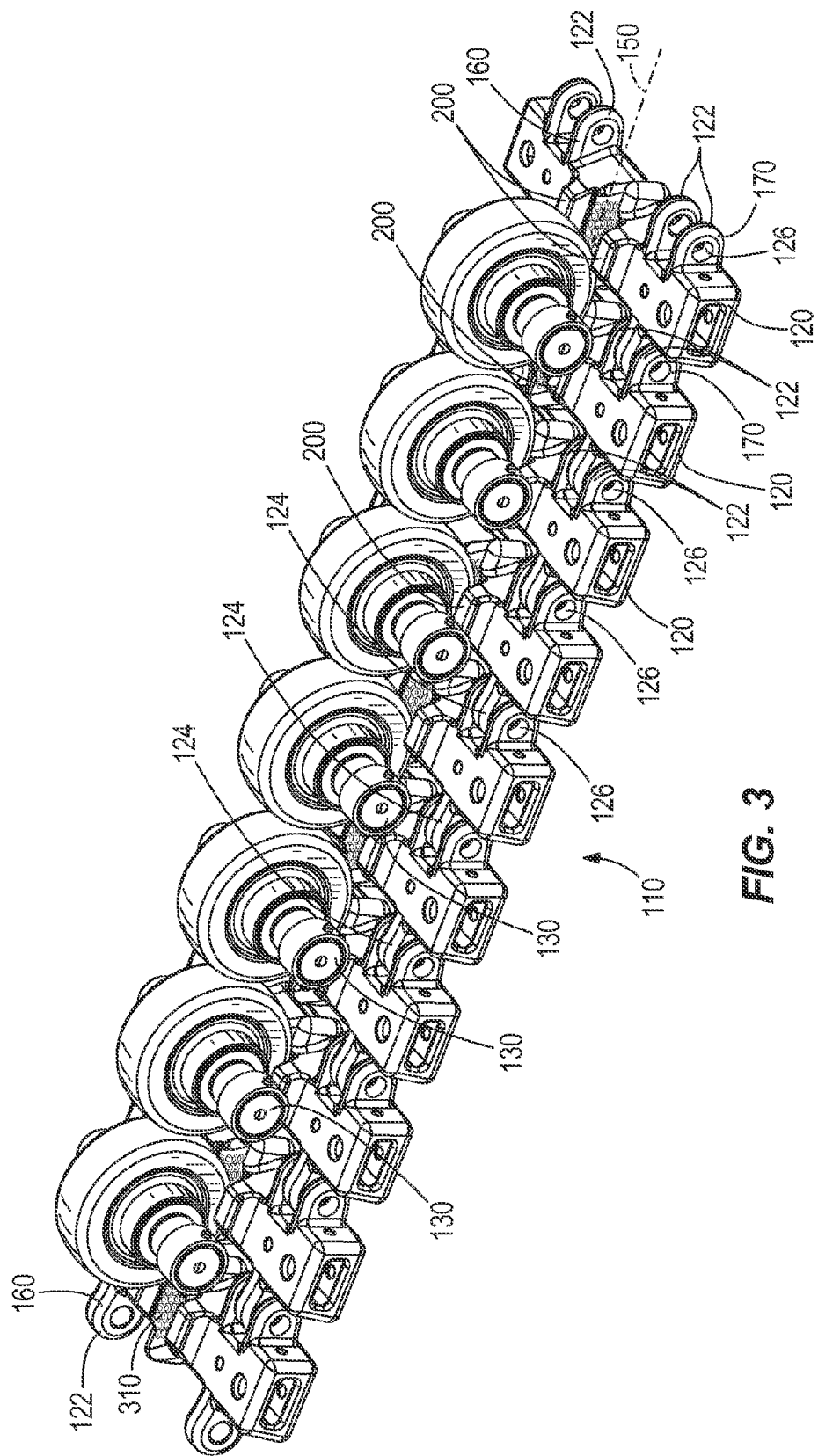
FIG. 3 is an enlarged partial side perspective view of the crawler track of FIG. 1, illustrating a row of rollers engaging the track shoes.
Figure 4:
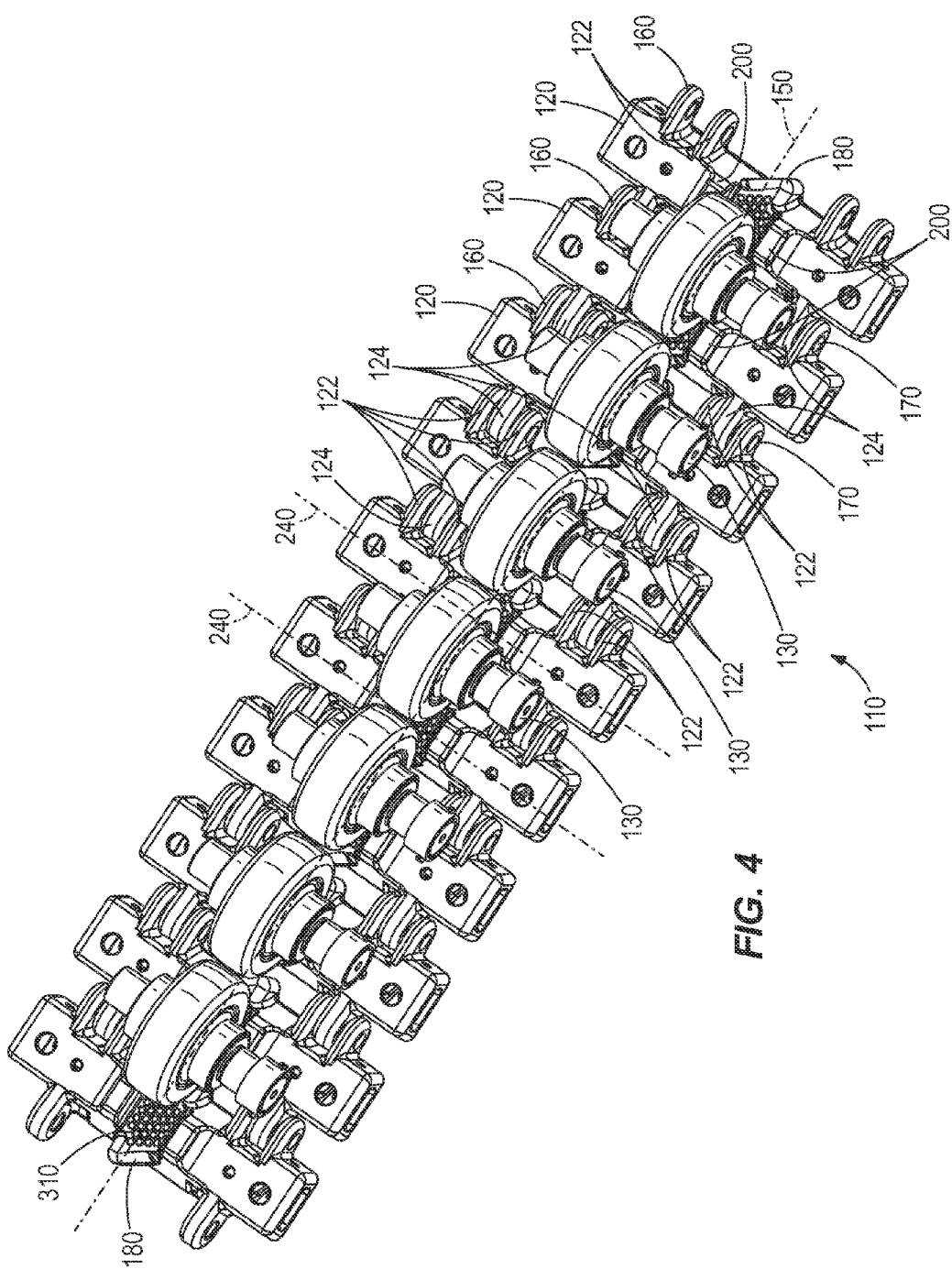
FIG. 4 is an enlarged partial top perspective view of the crawler track of FIG. 1, illustrating the row of roller engaging the track shoes.
Figure 5:
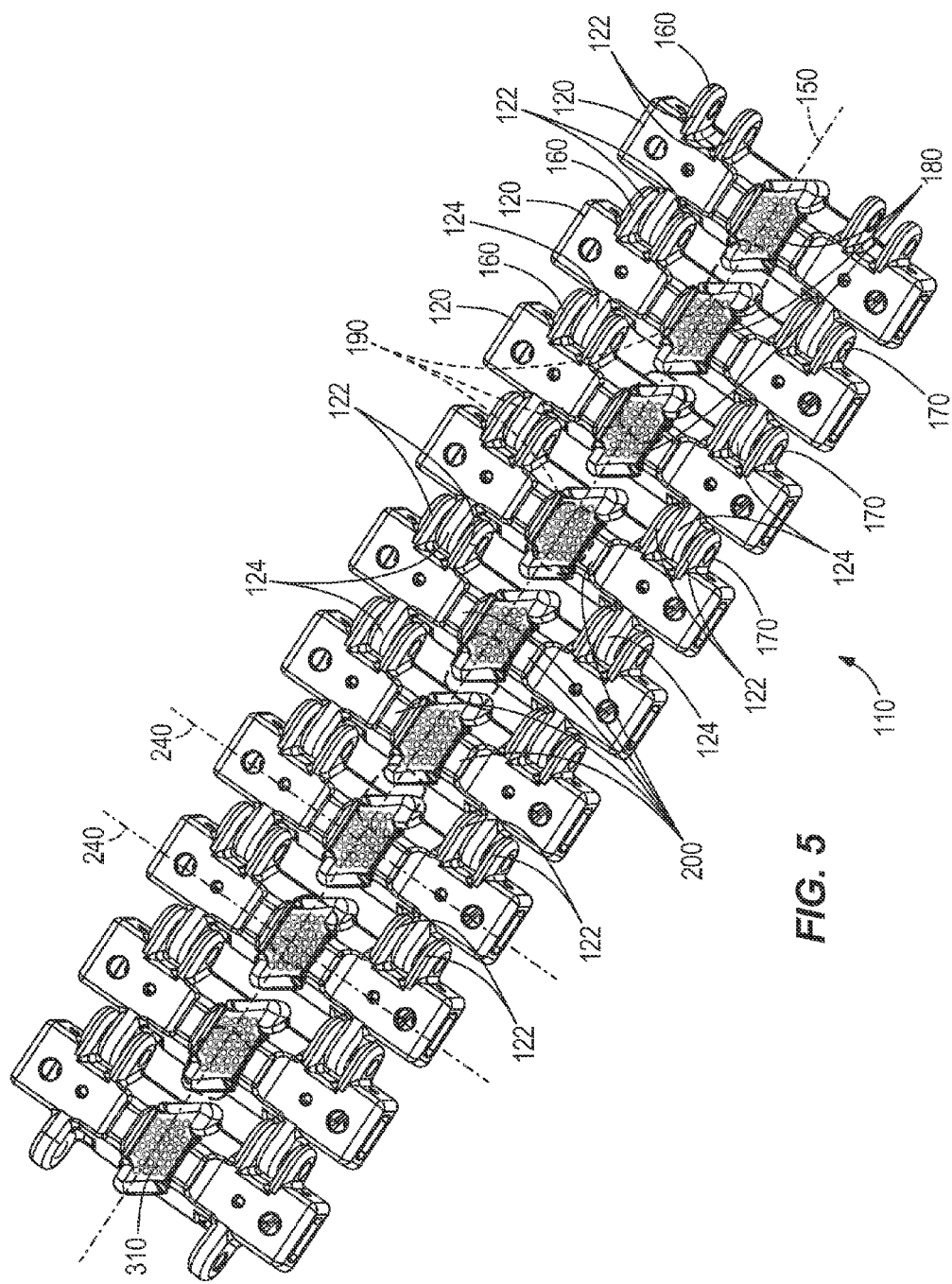
FIG. 5 is an enlarged partial top perspective view similar to FIG. 4, illustrating roller-engaging portions on the track shoes.

With reference to FIGS. 3-5, the rollers 130 engage the shoes 120 along a roller path axis 150 as the track 110 is driven. Each shoe 120 includes a first end defining a first coupling portion 160, a second end defining a second coupling portion 170, and an intermediate portion 180 extending between the first and second coupling portions 160, 170. The intermediate portions 180 of the shoes 120 engage the rollers 130. As illustrated in FIG. 5, the intermediate portions 180 include roller-engaging portions 190 along the roller path axis 150. In the illustrated construction the intermediate portions 180 also include a pair of raised alignment guides 200 adjacent the roller path axis 150 for aligning the rollers 130 relative to the shoes 120 and engaging the drive sprocket 140. In other constructions, at least one of the alignment guides 200 is omitted. The roller-engaging portions 190 of the shoes 120 bear the weight of the mining equipment 100. During movement or operation of the mining equipment 100, heavy loads are transmitted through the rollers 130 to the shoes 120. Such loads may wear, deform, or distort the shoes 120.

In some constructions, the shoes 120 are made of a manganese steel, also called Hadfield steel. The nominal composition of the manganese steel includes, by weight, approximately 0.8% to approximately 1.25% carbon, approximately 11% to approximately 15% manganese, and the balance iron and incidental elements and impurities, such as up to about 0.06% phosphorus, up to about 0.03% sulfur, up to about 0.80% silicon, up to about 1.2% chromium, up to about 2% molybdenum, and/or up to about 1.00% of other alloying elements. In other constructions, the shoes 120 are made of other suitable materials, such as alloy steels.

Under the weight of mining equipment, track shoes such as the shoes 120 may become plastically deformed or strained, potentially resulting in a metal flow such as extrusion, and thereby forming a wedge-shaped geometry known as a "toe nail." Excessive toe nailing can result in the metal flow interfering or binding with an adjacent shoe at ends of the roller path axis, particularly when the shoes are in an angulated configuration. The interference can create cracks in the toe nail and apply high stresses on the coupling portions of the shoes, contributing to harsh engagement and premature wear of the pivoting pins, pin lugs, and other drive components.

To avoid issues with the toe nail interference, toe nails on conventional shoes are sometimes trimmed before they begin to interfere with the operation of the track. The trimming is done with air arc cutting along the roller path axis, following by grinding of rough edges. Moreover, chamfers around pin bores are sometimes gouged and ground to eliminate cracks due to metal flow. However, trimming toe nails and chamfers around pin bores can be costly and time consuming.

Figure 6:
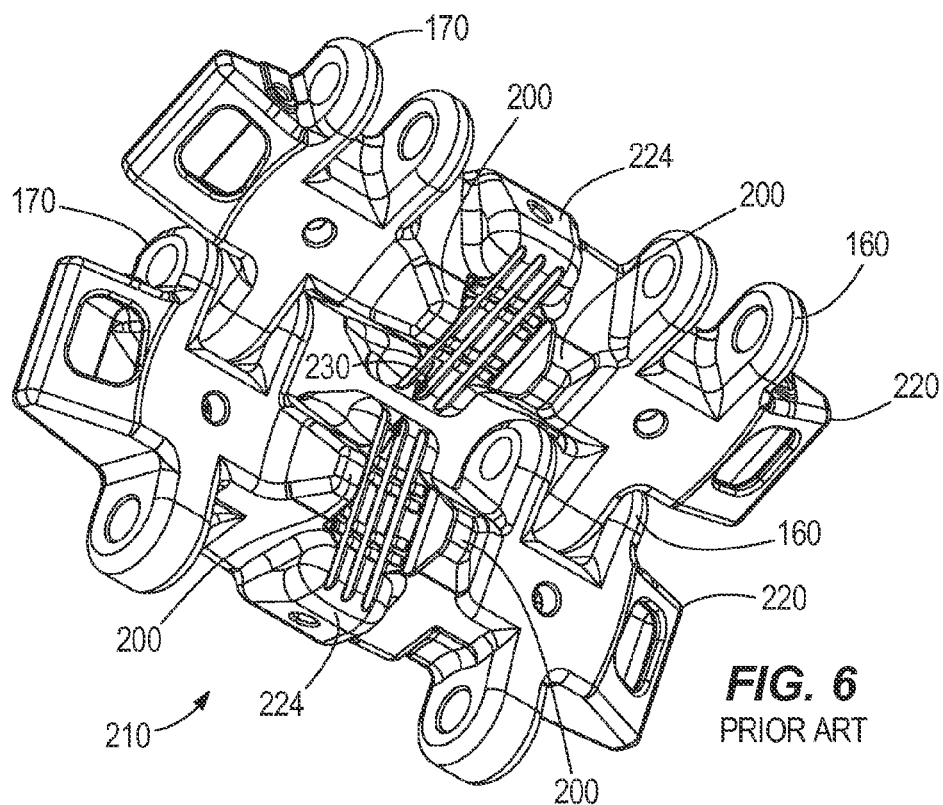
FIG. 6 is a perspective view of conventional track shoes in an angulated configuration.
Figure 7:
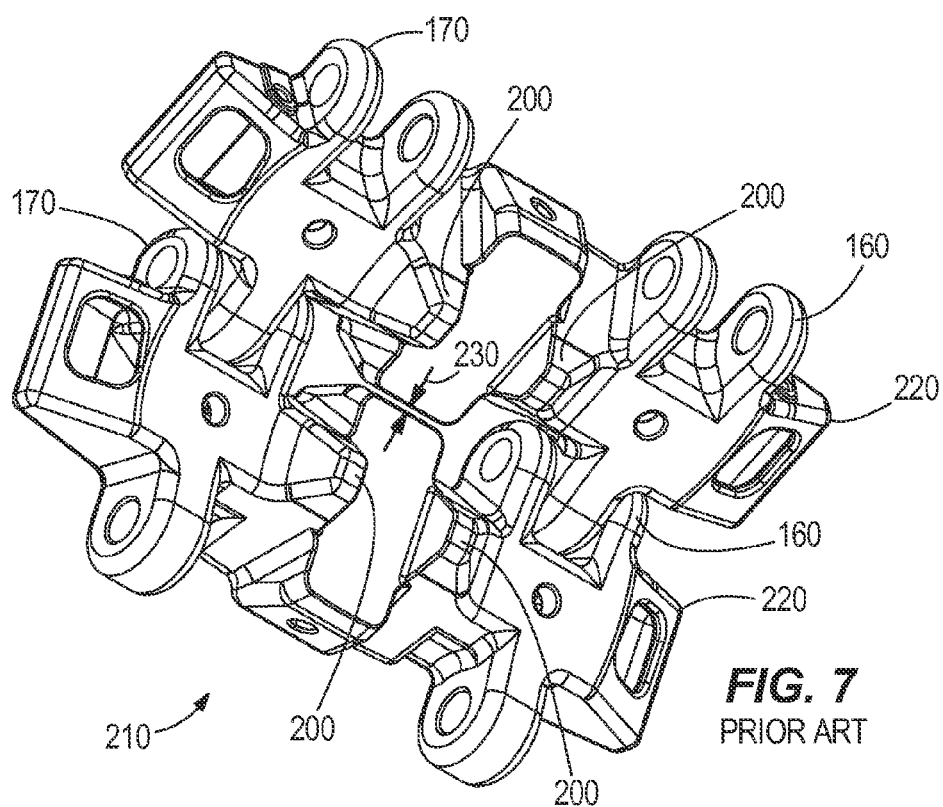
FIG. 7 is a perspective view similar to FIG. 6, illustrating the track shoes as worn and deformed.

FIGS. 6 and 7 illustrate a conventional track 210 with track shoes 220. To avoid issues with toe nail interference, the shoes 220 that are linked together with a significant gap or clearance 230 extending between corresponding intermediate portions 224. In the illustrated construction, the gap 230 between the intermediate portions 224 when the shoes 220 are in an angulated or wrapped-around configuration is approximately 37 mm. As the shoes 220 become worn and deformed through continued use under the weight of the mining equipment 100, the gap 230 is reduced. In FIG. 7, the illustrated gap 230 is reduced to approximately 23 mm. The gap 230 limits the number of shoes 220 that are in contact with the rollers 130 at any given time, and therefore the conventional shoes 220 are not as effective at distributing the load of the mining equipment 100 among the shoes 220. Moreover, the gap 230 creates a lumpy or bumpy ride as the rollers 130 engage the shoes 220. To substantially avoid or prevent the lumpy or bumpy ride, the gap 230 should be sufficiently small when the shoes 220 extend in a linear configuration for engaging the ground and supporting the rollers 130. On the other hand, when the shoes 220 are wrapped around the idler or tumbler 140, the gap 230 should be sufficiently large to substantially avoid deleterious effects of metal flow such as binding. However, conventional track shoes 220 have failed to meet these conflicting objectives.

Figure 8:
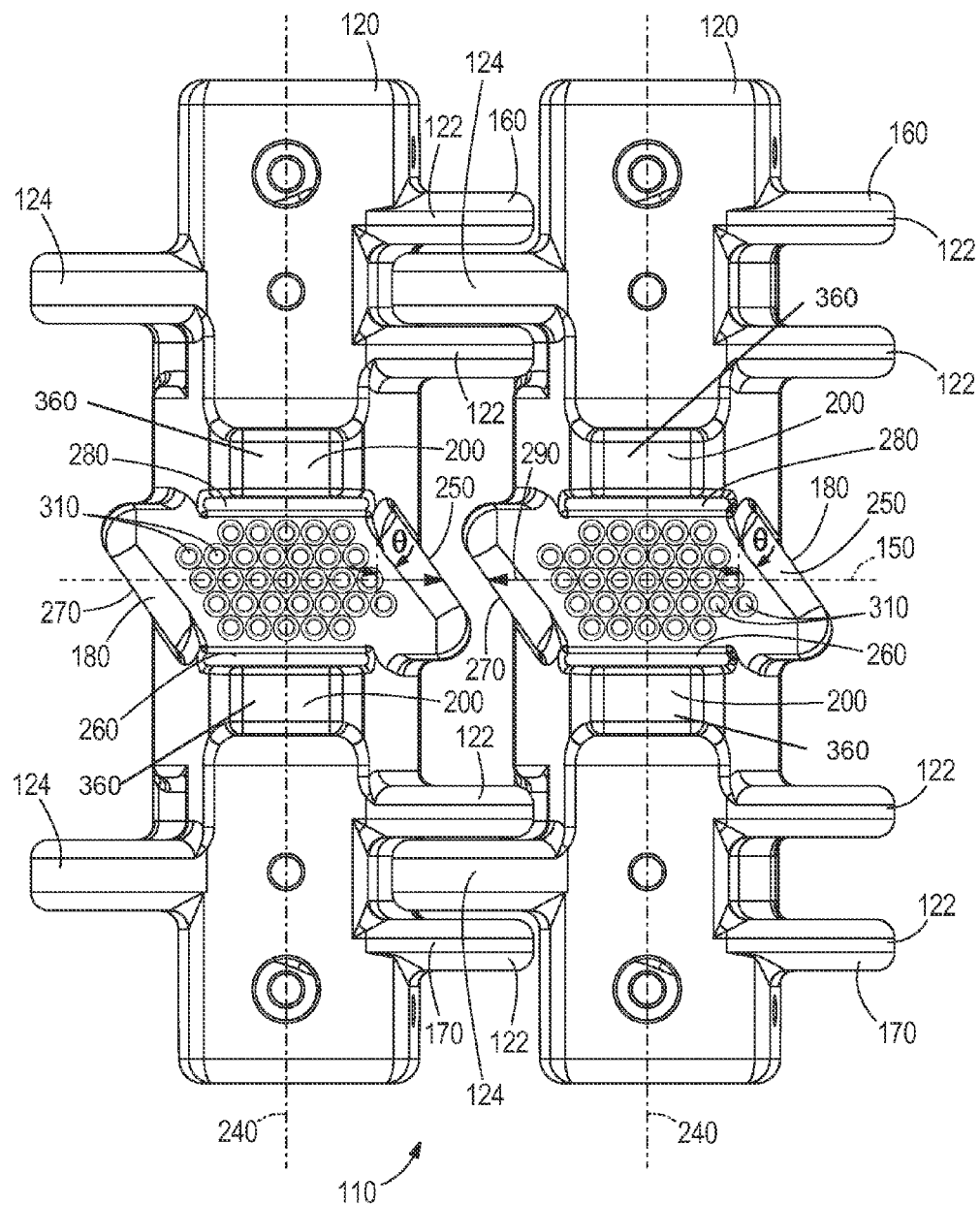
FIG. 8 is a top view of the track shoes of FIG. 1 in a non-angulated and unworn condition.
Figure 12:
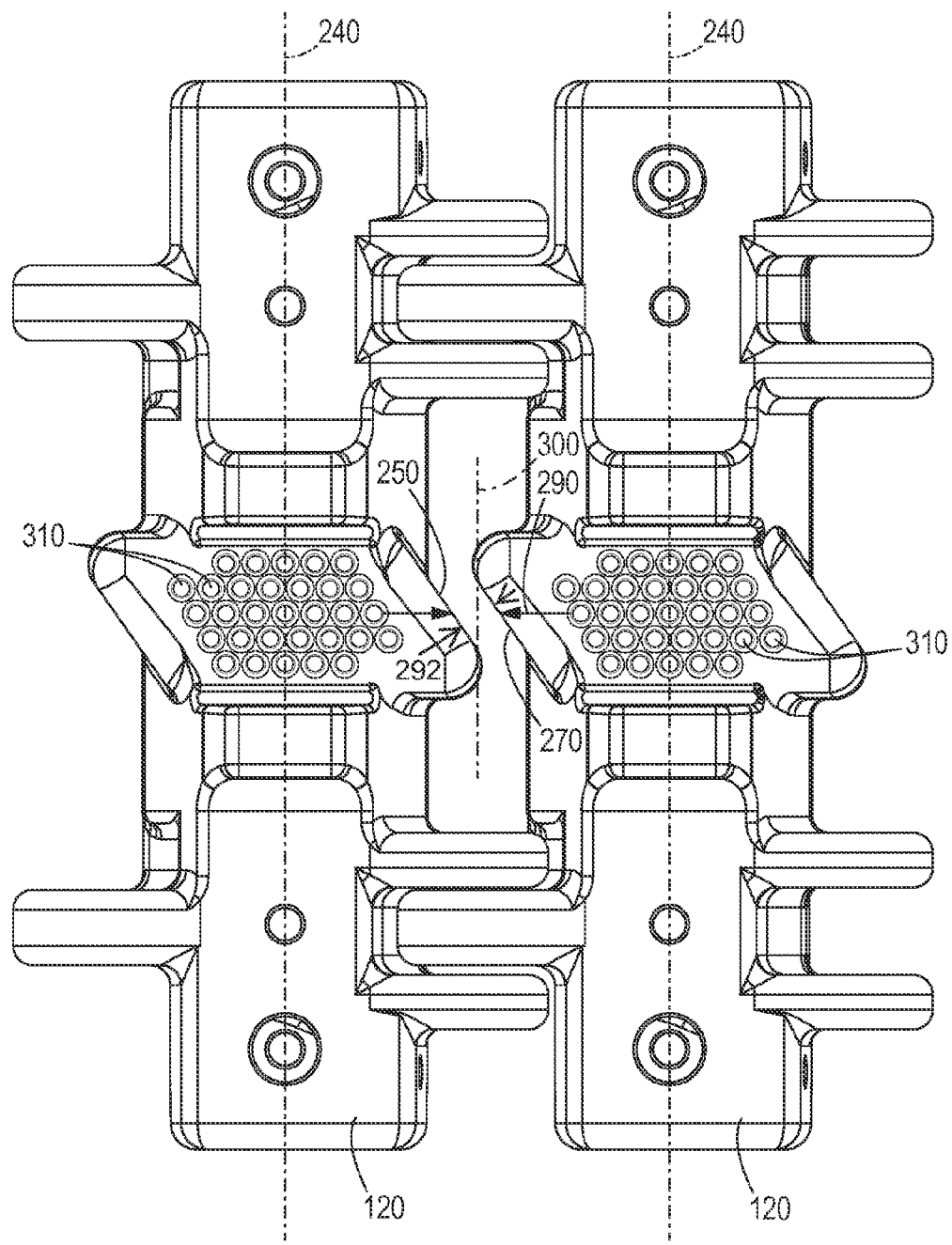
FIG. 12 is a top view similar to FIG. 8, illustrating overlapping faces of adjacent track shoes in a non-angulated and unworn condition.

The track shoes 120 illustrated in FIGS. 1-5 and 8-12 overcome the gap issues described above with respect to the conventional track shoes 220 in FIGS. 6 and 7. For example, as illustrated in FIGS. 8 and 12, each shoe 120 defines a longitudinal axis 240 extending between the first and second coupling portions 160, 170 and substantially perpendicular to the roller path axis 150. With reference to FIGS. 8-12, in the illustrated construction, the intermediate portion 180 between the first and second coupling portions 160, 170 includes four successive faces 250, 260, 270, 280 when viewed from above in a direction substantially perpendicular to the longitudinal axis 240 and to the roller path axis 150. The first and third faces 250, 270 extend parallel to each other. The second and fourth 260, 280 are defined by the abutting alignment guides 200, and also extend parallel to each other and to the roller path axis 150. The first and third faces 250, 270 each extend at an acute angle θ relative to the longitudinal axis 240. In the illustrated construction, the angle θ is about 36°. In other constructions, the acute angle θ ranges from about 15° to about 45°, from about 15° to about 40°, from about 30° to about 45°, or from about 30° to about 40°. Other constructions include different ranges and values. In the illustrated construction the intermediate portion 180 resembles a parallelogram when viewed from above in a direction substantially perpendicular to the longitudinal axis 240 and to the roller path axis 150. In the illustrated construction, the faces 250 and 270 extend substantially aligned or parallel to each other. In other constructions, the faces 250 and 270 are up to about 15° out of alignment. Moreover, in some constructions one or both of the faces 250, 270 are made up of one or more arcuate portions. In the illustrated construction, all of the faces 250, 260, 270, 280 are joined to each other at rounded corners. In other constructions, less than all (e.g., none) of the faces 250, 260, 270, 280 are joined to each other at rounded or bull-nosed corners. In the illustrated construction the intermediate portions 180 are integrally formed, via casting, with the first and second coupling portions 160, 170.

The shoes 120 are linked together with a gap or clearance 290 extending therebetween. When the shoes 120 are in the angulated and unworn condition (FIG. 10), the gap 290 between the intermediate portions 180 is approximately 36 mm, similar to the gap 230 of the conventional track shoes 220 illustrated in FIG. 6. Likewise, when the shoes 120 are in the angulated and worn condition (FIG. 11), the gap 290 between the intermediate portions 180 is comparable to the gap 230 of the conventional track shoes 220 as seen in FIG. 7 (e.g., approximately 23 mm).

With reference to FIG. 12, in the non-angulated and unworn condition, the gap 290 in the illustrated construction is approximately 2.85 inches (as opposed to, for example, a gap 290 of approximately 3.75 inches on a conventional shoe in a non-angulated, unworn condition such as that in FIG. 12). In some constructions the gap 290 in the illustrated construction in FIG. 12 is between approximately 2.8 and 2.9 inches. Other constructions include different ranges.

With continued reference to FIG. 12, in the non-angulated and unworn condition, a distance 292 extending transversely between the faces 250 and 270 in the illustrated construction is approximately 2.3 inches. In some constructions the distance 292 of the illustrated construction shown in FIG. 12 is between approximately 2.1 and 2.5 inches. Other constructions include different ranges.

With continued reference to FIG. 12, the faces 250, 270 of the adjacent shoes 120 in the illustrated construction are at least partially overlapping when viewed along an axis 300 extending substantially parallel to the longitudinal axes 240 of the shoes 120. Thus, when the shoes 120 are in a linear configuration, in both unworn and worn conditions, the rollers 130 maintain contact with the shoes 120 on a substantially continuous basis without significant interruptions or intervals. That is, the roller-engaging portions 190 of the shoes 120 are interrupted by the gap 290 to a lesser degree as compared to the conventional shoes 220. This helps to more effectively distribute the load of the mining equipment 100 among the shoes 120 and provide a smoother ride, particularly at a high travel speed of the mining equipment 100. In other constructions, the faces 250, 270 of the adjacent shoes 120 contact the axis 300 at respective points without substantial overlap. In still other constructions, the faces 250, 270 of the adjacent shoes 120 are slightly separated from the axis 300 by a distance that is less than the gap 230 of the conventional track shoes 220. In some constructions the faces 250, 270 of the adjacent shoes are slightly separated from the axis 300 by a distance that is less than one inch. In some constructions only as the shoes 120 wear down do the faces 250, 270 begin to overlap along the axis 300.

With reference to FIGS. 2-5 and 8-12, the shoes 120 also include peening pads 310 that are arranged in patterns along the intermediate portions 180. The peening pads 310 are wear components that absorb wear from the mining equipment 100 and rollers 130. Other constructions do not include peening pads 310.

Figure 9:
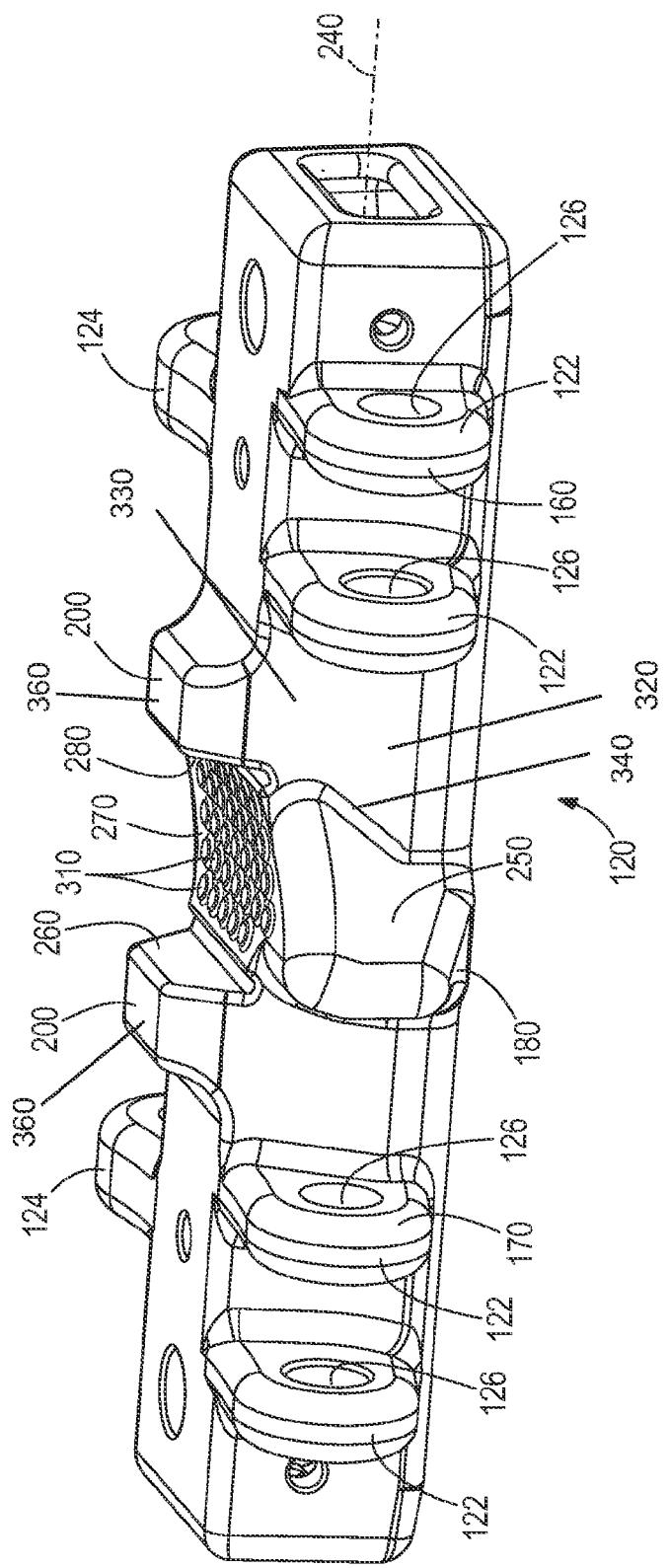
FIG. 9 is a side perspective view of one of the track shoes of FIG. 8.
Figure 10:
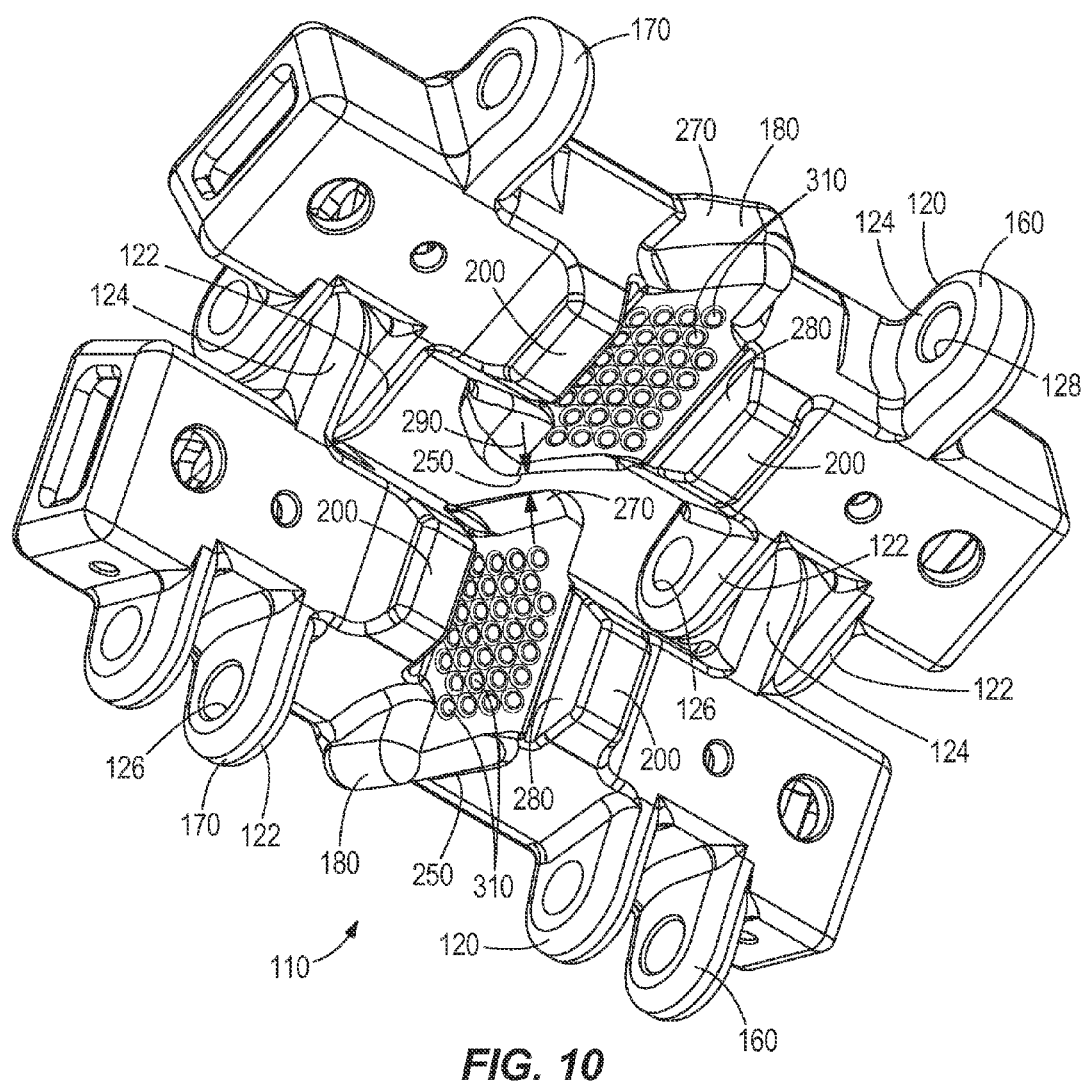
FIG. 10 is a top perspective view of the track shoes of FIG. 8, illustrating the track shoes in an angulated configuration.
Figure 11:
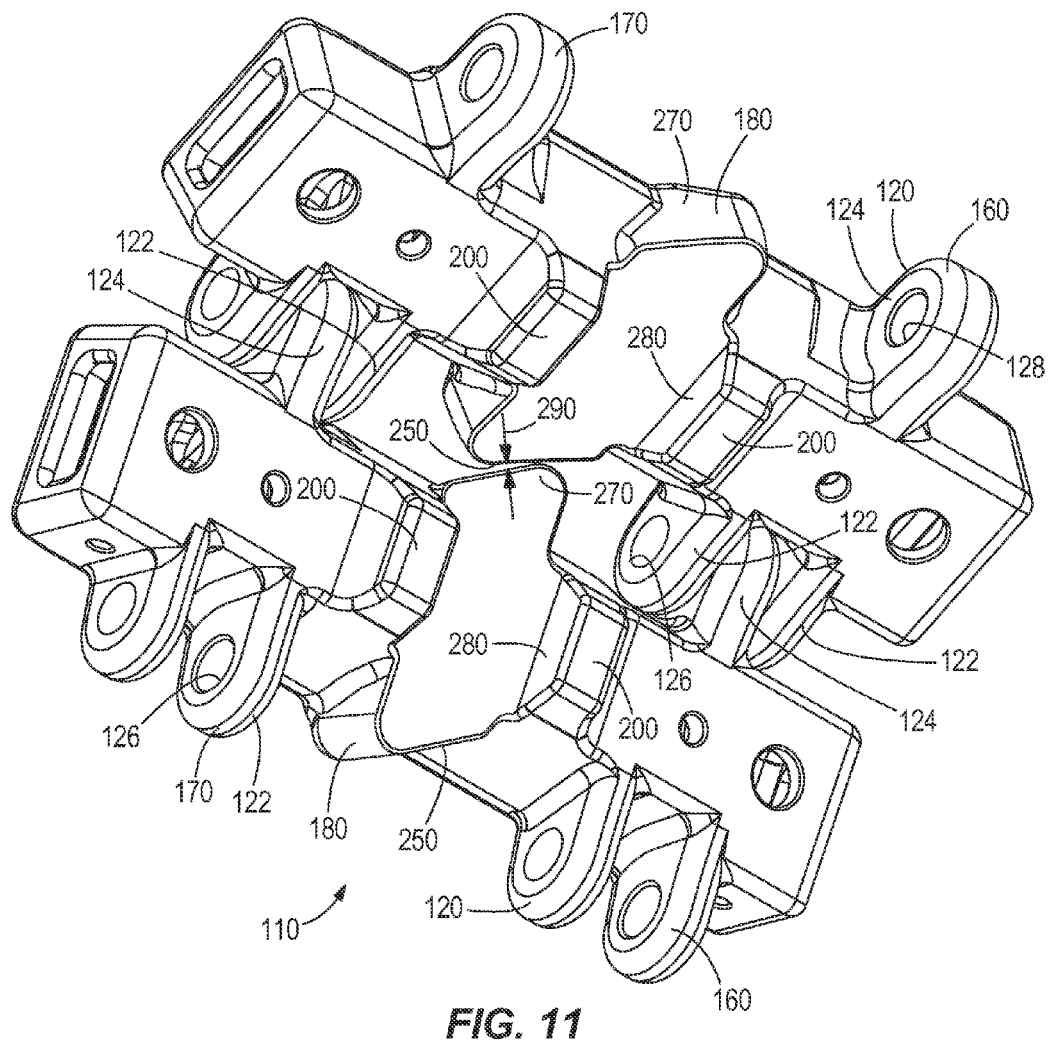
FIG. 11 is a perspective view similar to FIG. 10, illustrating the track shoes as worn and deformed.

With reference to FIG. 9, in the illustrated construction the intermediate portion 180 transitions into a plane 320 along at least one side 330 of the first and/or second coupling portion 160, 170 through at least one curved fillet surface 340. In some constructions the intermediate portion 180 transitions into both the first and second coupling portions 160, 170 through a plurality of fillet surfaces 340 along four or more sides of the intermediate portion 180.

Figure 2:
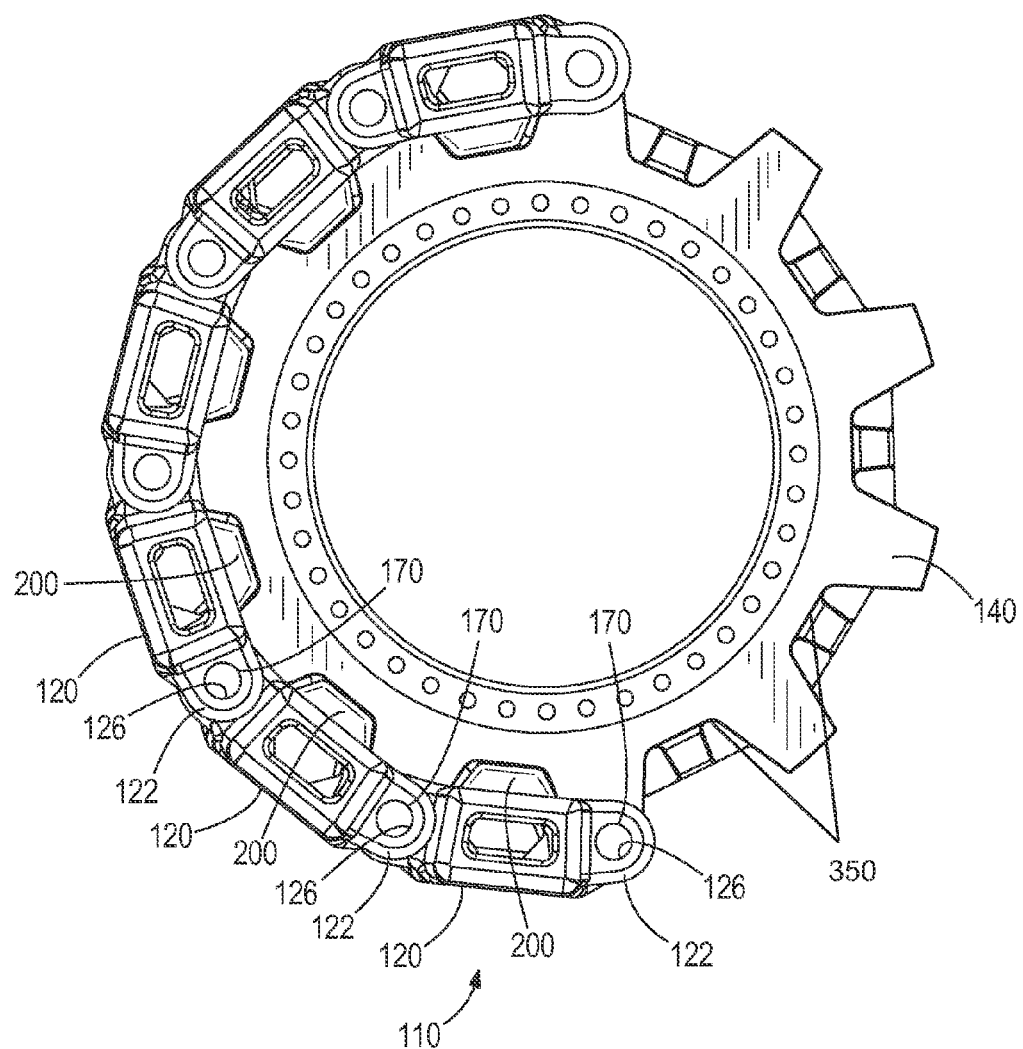
FIG. 2 is an enlarged partial side of the crawler track of FIG. 1, illustrating track shoes angulated around a drive sprocket.

With reference to FIGS. 2, 8, and 9, in the illustrated construction the alignment guides 200 project into recesses 350 (FIG. 2) of the tumbler 140. The alignment guides 200 include top surfaces 360 (FIGS. 8 and 9) that are larger than conventional alignment guides (e.g., as compared to the alignment guides 200 shown in FIG. 6). As the material along the intermediate portion 180 along axis 150 wears down, the alignment guides 200 in the illustrated construction do not wear as quickly (or substantially at all). The alignment guides 200 experience less contact pressure and metal flow than the intermediate portions 180.

Although the invention has been described in detail with reference to certain preferred embodiments, variations and modifications exist within the scope and spirit of one or more independent aspects of the invention as described.

The invention claimed is:

1. A shoe for a crawler track, the shoe comprising:
   a first end;
   a second end;
   a longitudinal axis extending between the first and second ends;
   a roller path axis extending perpendicular to the longitudinal axis;
   an intermediate portion disposed between the first and second ends, the intermediate portion including a roller-engaging portion disposed along the roller path axis, the intermediate portion including four successive faces that form a parallelogram when viewed from a direction substantially perpendicular to the longitudinal axis, wherein two of the four faces are disposed at an acute angle relative to the longitudinal axis.

2. The shoe of claim 1, wherein two of the four faces are aligned parallel to the roller path axis.

3. The shoe of claim 1, wherein the intermediate portion is integrally formed with the first and second ends.

4. The shoe of claim 1, wherein the acute angle is between approximately 15 degrees and 45 degrees.

5. The shoe of claim 4, wherein the acute angle is approximately 36 degrees.

6. The shoe of claim 1, wherein the roller-engaging portion includes peening pads.

7. The shoe of claim 1, wherein the four faces are joined at rounded corners.

8. The shoe of claim 1, wherein each of the first and second ends includes a male member and female member, each of the male and female members including a hole to receive a pin.

9. A crawler track comprising:
   a first and second shoe coupled together, each of the first and second shoes comprising:
      a first end;
      a second end;
      a longitudinal axis extending between the first and second ends;
      a roller path axis extending perpendicular to the longitudinal axis; and
      an intermediate portion disposed between the first and second ends, the intermediate portion including a roller-engaging portion disposed along the roller path axis, the intermediate portion also including an angled face disposed at an acute angle relative to the longitudinal axis;
   wherein an axis extending substantially parallel to the longitudinal axes of the first and second shoes intersects the angled face of the first shoe and the angled face of the second shoe.

10. The crawler track of claim 9, wherein a gap exists along the roller path axis between the two angled faces.

11. The crawler track of claim 10, wherein the gap is approximately 36 mm when the first and second shoes are in an angulated and unworn condition.

12. The crawler track of claim 9, wherein the intermediate portion transitions into a plane along a side of the first end through a curved fillet surface.

13. The crawler track of claim 9, wherein the acute angle is between 15 degrees and 45 degrees.

14. The crawler track of claim 9, wherein each of the first and second ends includes a male member and female member, each of the male and female members including a hole to receive a pin.

15. The crawler track of claim 9, wherein the roller path axis of each of the first and second shoes intersects a center of the intermediate portion along the longitudinal axis and the angled face of the intermediate portion.

* * * * *